(12) United States Patent
Duthel et al.

(10) Patent No.: US 8,638,489 B2
(45) Date of Patent: Jan. 28, 2014

(54) FILTER-LESS GENERATION OF COHERENT OPTICAL SUBCARRIERS

(75) Inventors: Thomas Duthel, Nuremberg (DE); James Whiteaway, Hertfordshire (GB)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/269,676

(22) Filed: Oct. 10, 2011

(65) Prior Publication Data

US 2013/0088765 A1    Apr. 11, 2013

(51) Int. Cl.
*G02F 1/23*    (2006.01)
*G02F 1/00*    (2006.01)
*H04B 10/04*    (2011.01)

(52) U.S. Cl.
USPC ............. 359/278; 359/237; 398/69; 398/76; 398/183; 398/184; 398/187; 398/201

(58) Field of Classification Search
USPC ............ 359/237–239, 278; 398/83, 140, 141, 398/152, 182–186, 200, 201; 385/2, 3; 356/477, 478
See application file for complete search history.

(56) References Cited

U.S. PATENT DOCUMENTS

| | | | | |
|---|---|---|---|---|
| 5,999,300 A | * | 12/1999 | Davies et al. | 398/185 |
| 7,142,788 B2 | * | 11/2006 | Price | 398/184 |
| 7,317,877 B2 | * | 1/2008 | Price | 398/184 |
| 7,577,367 B2 | * | 8/2009 | Way | 398/183 |
| 7,978,975 B2 | * | 7/2011 | Qian et al. | 398/69 |
| 8,135,279 B2 | * | 3/2012 | Mertz | 398/76 |

OTHER PUBLICATIONS

S. Shimotsu, et al., "Single Side-Band Modulation Performance of a LiNbO3 Integrated Modulator Consisting of Four-Phase Modulator Waveguides", IEEE Photonics Technology Letters, vol. 13, No. 4, Apr. 2001.

* cited by examiner

*Primary Examiner* — Loha Ben
(74) *Attorney, Agent, or Firm* — Edell, Shapiro & Finnan, LLC

(57) ABSTRACT

Techniques and configurations are provided to generate multiple coherent optical subcarriers. A laser source generates as output a light beam at a carrier frequency. A multicarrier generator is provided that is coupled to the laser source and comprises one or more dual carrier generators each configured to modulate the light beam at the same modulation frequency or different modulation frequencies so as to output a plurality of light beams each at a different subcarrier frequency that is offset from the carrier frequency. The multicarrier generator generates the plurality of light beams on individual outputs, e.g., fibers, without the need for an optical demultiplexing filter.

20 Claims, 5 Drawing Sheets

US 8,638,489 B2

FILTER-LESS GENERATION OF COHERENT OPTICAL SUBCARRIERS

TECHNICAL FIELD

The present disclosure relates to the generation of optical subcarriers for optical communication networks.

BACKGROUND

Optical super channels with individual sub-channels involve the generation of several optical carriers separated by defined frequency/wavelength spacing, call optical subcarriers. This can be achieved using independent laser sources which, in general, are not phase or frequency locked. Alternatively, so-called comb generators can be used to generate several phase locked carriers from a single laser source.

DESCRIPTION OF EXAMPLE EMBODIMENTS

Overview

Techniques and configurations are provided to generate multiple coherent optical subcarriers. A laser source generates as output a light beam at a carrier frequency. A multicarrier generator is provided that is coupled to the laser source and comprises one or more dual carrier generators each configured to modulate the light beam at the same modulation frequency or at different ones so as to output a plurality of light beams each at a different subcarrier frequency that are offset from the carrier frequency. Moreover, the multicarrier generator generates the plurality of light beams on individual or separate outputs, e.g. fibers, without the need for an optical demultiplexing filter.

Example Embodiments

Figure 1:
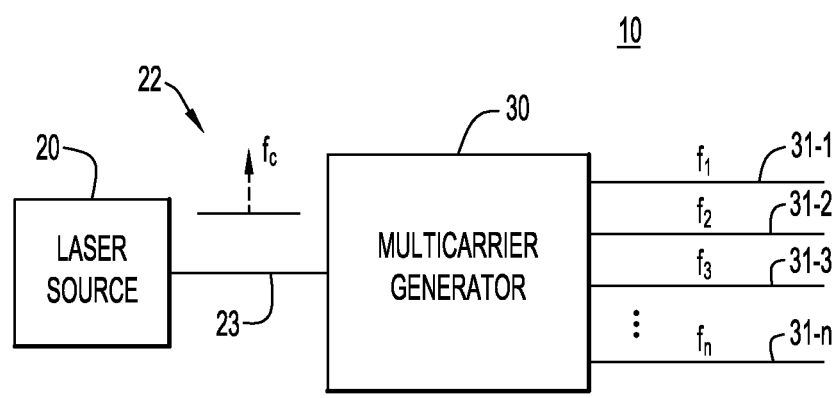
FIG. 1 is a block diagram generally depicting a system configured to generate coherent optical carriers on individual outputs using a multicarrier generator without the use of an optical demultiplexing filter.

Referring first to FIG. 1, a system 10 is shown that generates coherent optical carriers on individual or separate outputs, e.g., optical fibers, using a multicarrier generator without the use of an optical demultiplexing filter. The system 10 comprises a tunable or fixed laser source 20, and a multicarrier generator 30. The laser source 20 generates a coherent (laser) light beam 22 at a carrier frequency denoted $f_c$ that is coupled via an optical fiber 23 to the multicarrier generator 30. The multicarrier generator 30 receives as input the light beam from the laser source 20 and generates a plurality of light beams at different carrier frequencies (subcarriers) $f_1$, $f_2$, ..., $f_n$, offset from the carrier frequency $f_c$ on separate optical fibers 31-1, 31-2, ..., 31-n.

As described herein, the multicarrier generator 30 comprises a plurality of dual carrier generators each configured to modulate the light beam at a different, or similar, modulation frequency so as to output, on individual or separate outputs, e.g. optical fibers, a plurality of light beams each at a different subcarrier frequency that is offset from the carrier frequency, and without the need for an optical demultiplexing filter(s) or similar demultiplexing component. Several forms of the multicarrier generator 30 are described hereinafter.

Figure 2:
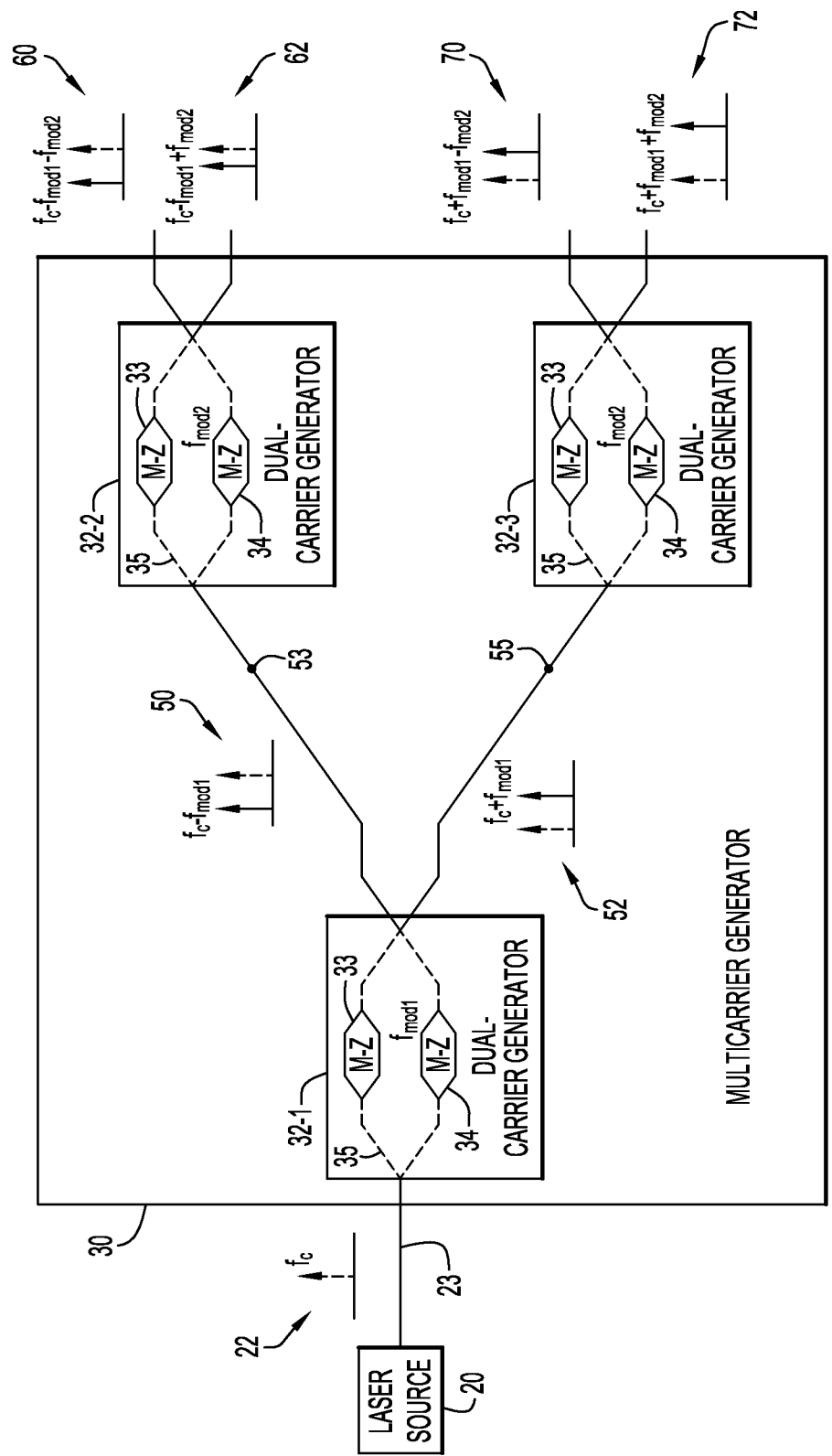
FIG. 2 is a block diagram of a multicarrier generator according to one embodiment that is useful in the system shown in FIG. 1.

Reference is now made to FIG. 2 for a description of a multicarrier generator according to one embodiment. In this embodiment, the multicarrier generator 30 comprises a plurality of dual carrier generators connected in a cascaded manner. For example, the multicarrier generator 30 comprises a first dual carrier generator 32-1 in a first stage, and a second dual carrier generator 32-2 and a third dual carrier generator 32-3, both in a second stage.

Each of the dual carrier generators 32-1, 32-2 and 32-3 are the same, but are driven with different or similar modulation frequencies. For example, each dual carrier generator comprises dual-parallel Mach-Zehnder (M-Z) type IQ optical modulators, which consist of two child modulator sections 33 and 34 surrounded by a parent modulator section shown at reference numeral 35. The child modulator sections 33 and 34 are driven by a modulation frequency with a 90° relative phase between them. For example, dual carrier generator 32-1 is driven with a modulation frequency $f_{mod1}$. Two light beams are produced, one shown at reference numeral 50 at frequency $f_c - f_{mod1}$ and another shown at reference numeral 52 at frequency $f_c + f_{mod1}$, and both light beams are used for purposes of the multicarrier generation techniques described herein. Thus, each dual carrier generator produces light beams at two subcarriers at frequencies separated by twice the modulation frequency. Undesired harmonics generated by the dual carrier generator can be suppressed by a proper choice of drive voltage, e.g. 2 Vpi on each dual carrier generator gives 18 dB suppression of higher order harmonics.

The dual-parallel M-Z type IQ modulators 32-1, 32-2 and 32-3 generate several equally spaced and phase locked optical carriers from a single laser source. For this purpose, each modulator is stimulated with two 90° phase shifted electrical harmonics of the same frequency. In contrast to previously known schemes, the techniques described herein outputs individual subcarriers from separate optical output ports, i.e., separate light beams each at different subcarrier frequencies. In a simple case, the scheme provides two carriers separated by twice the modulation frequency of say 15 GHz, giving carriers spaced at +/−15 GHz for 30 GHz total carrier spacing. However, the scheme can be extended to provide more carriers by further cascading the fundamental modulator structure depicted in FIG. 2.

The dual carrier generator 32-1 receives as input the light beam from the laser source at a carrier frequency $f_c$. Dual carrier generator 32-2 receives as input the light beam 50 at $f_c - f_{mod1}$, and modulates this light beam at a modulation frequency $f_{mod2}$. As a result, dual carrier generator 32-2 generates a light beam 60 at frequency $f_c - (f_{mod1} + f_{mod2}) = f_c - f_{mod1} - f_{mod2}$ and a light beam 62 at frequency $f_c - f_{mod1} + f_{mod2}$. Similarly, dual carrier generator 32-3 receives as input the light beam 52 at $f_c + f_{mod1}$. Consequently, dual carrier generator 32-3 generates a light beam 70 at frequency $f_c + f_{mod1} - f_{mod2}$ and a light beam 72 at frequency $f_c + f_{mod1} + f_{mod2}$. Thus, in the example shown in FIG. 2, the multicarrier generator 30 outputs four light beams at four different frequencies (subcarriers) offset from a carrier frequency $f_c$. In addition, the light beams 22, 50 and 52 can be tapped at points 23, 53 and 55 in FIG. 2 to obtain light beams at three additional frequencies. In one example, for four subcarriers with 30 GHz separation, the modulation frequency $f_{mod1}$ is set at 30 GHz and the modulation frequency $f_{mod2}$ is set at 15 GHz.

In the dual carrier generators referred to herein, higher order harmonics generated by the modulation process may be suppressed by proper selection of the drive voltage. For example, 2 Vpi on each dual carrier generators 32-1, 32-2 and 32-3 gives an 18 dB suppression of higher order harmonics. Each dual carrier generators 32-1, 32-2 and 32-3 is biased at zero transmission and quadrature for child and parent modulator, respectively.

In summary, the multicarrier generator 30 of FIG. 2 comprises a first dual carrier generator coupled to receive as input a coherent light beam at a carrier frequency output by a laser source and to modulate the light beam at a first modulation frequency so as to output a first light beam at a first subcarrier frequency that is less than the carrier frequency by an amount corresponding to the first modulation frequency, and a second light beam at a second subcarrier frequency that is greater than the carrier frequency by an amount corresponding to the first modulation frequency; and second and third dual carrier generators coupled to the first dual carrier generator. The second dual carrier generator is configured to receive as input the first light beam at the first subcarrier frequency and the third dual carrier generator is configured to receive as input the second light beam at the second subcarrier frequency. More specifically, the second dual carrier generator is configured to modulate the first light beam at a second modulation frequency to output a third light beam at a third subcarrier frequency that is less than the carrier frequency by an amount equal to a sum of the first modulation frequency and the second modulation frequency, and to output a fourth light beam at a fourth subcarrier frequency that is less than the carrier frequency by an amount corresponding to the difference of the first modulation frequency and the second modulation frequency. Similarly, the third dual carrier generator is configured to modulate the second light beam at the second modulation frequency to output a fifth light beam at a fifth subcarrier frequency that is greater than the carrier frequency by an amount corresponding to the first modulation frequency minus the second modulation frequency, and to output a sixth light beam at a sixth subcarrier frequency that is greater than the carrier frequency by an amount corresponding to a sum of the first modulation frequency and the second modulation frequency.

Figure 3:
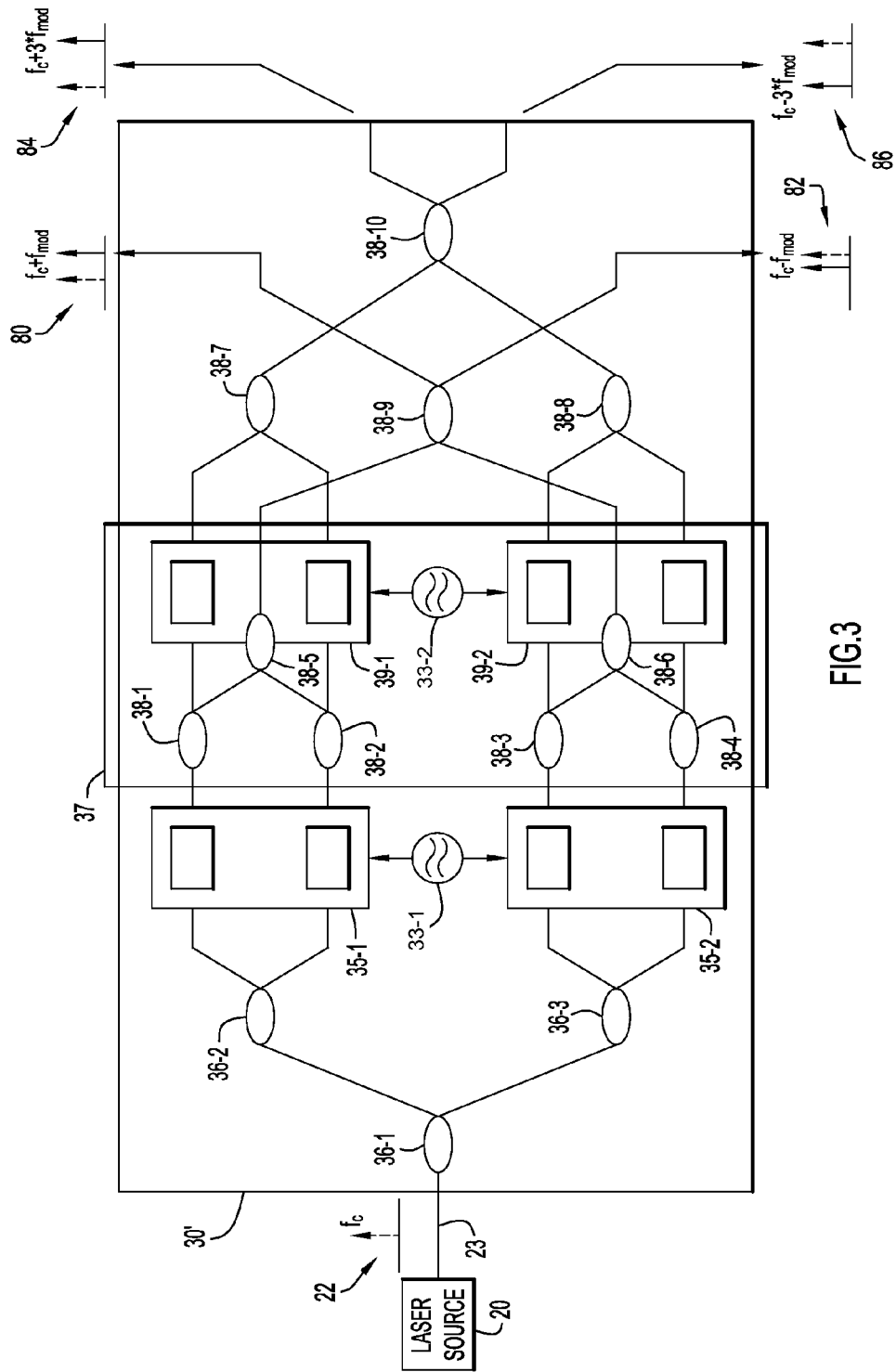
FIG. 3 is a block diagram of a multicarrier generator according to another embodiment.

Turning now to FIG. 3, another configuration for the multicarrier generator is shown at reference numeral 30'. In this configuration, a dual carrier generator scheme similar to that shown in FIG. 2 is extended to provide several outputs with separate subcarriers. In contrast to the cascaded implementation of the multicarrier generator 30 of FIG. 2, the implementation of the multicarrier generator 30' generates the different subcarriers by letting the light travel through several push-pull electrode pair stages, where each stage further increases the induced rotation of the optical field vector.

The multicarrier generator 30' comprises optical splitters 36-1, 36-2 and 36-3 that split out the light beam they receive as input to light beams at different points (in the multicarrier generator) in order to produce the plurality of light beams at their respective subcarrier frequencies. Splitter 36-1 receives as input the light beam 22 at carrier frequency $f_c$ and splits it off to splitters 36-2 and 36-3. There is a first push-pull electrode pair 35-1 and a second push-pull electrode pair 35-2. The push-pull electrode pairs 35-1 and 35-2 are the same as the dual-electrode structure that are found in a Mach-Zehnder type optical modulator referred to above, and driven by a modulation frequency source 33-1 at modulation frequency $f_{mod}$. The optical splitter 36-2 further splits the light beam at carrier frequency $f_c$ into two beams that are supplied to the electrode pair 35-1. Similarly, the optical splitter 36-3 further splits the light beam at carrier frequency $f_c$ into two beams that are supplied to the second push-pull electrode pair 35-2. Each of the push-pull electrode pairs 35-1 and 35-2 generates two outputs that are coupled to a splitter/electrode block 37.

The splitter/electrode block or section 37 comprises a plurality of splitters 38-1, 38-2, 38-3 and 38-4, each of which is coupled to a corresponding one of the outputs of the push-pull electrode pairs 35-1 and 35-2. Optical combiner 38-5 is coupled to the outputs of the optical splitters 38-1 and 38-2 to combine the outputs therefrom. Similarly, optical combiner 38-6 is coupled to the outputs of the optical splitters 38-3 and 38-4 to combine the outputs therefrom. In the splitter/electrode block 37 there are yet two additional push-pull electrode pairs 39-1 and 39-2. Push-pull electrode pair 39-1 receives as input the outputs of the optical splitters 38-1 and 38-2, and push-pull electrode pair 39-2 receives as input the outputs of the optical splitters 38-3 and 38-4. The output of the optical combiner 38-5 passes through to an optical combiner/splitter 38-9. The output of the optical combiner 38-6 also passes through to the optical combiner/splitter 38-9. The push-pull electrode pairs 39-1 and 39-2 are driven by modulation frequency source 33-2 at modulation frequency $f_{mod}$.

The outputs of the push-pull electrode pair 39-1 are coupled to an optical combiner 38-7 and the outputs of the push-pull electrode pair 39-2 are coupled to an optical combiner 38-8. The optical combiner/splitter 38-9 combines the outputs from the optical splitters 38-5 and 38-6 and generates as output two light beams 80 and 82: light beam 80 at $f_c+f_{mod}$ and light beam 82 at $f_c-f_{mod}$. Similarly, the outputs of the optical combiners 38-7 and 38-8 are supplied to an optical combiner/splitter 38-10 that generates as outputs two light beams 84 and 86: light beam 84 is at $f_c+3*f_{mod}$ and light beam 82 at $f_c+3*f_{mod}$.

The configuration of the multicarrier generator 30' uses additional splitter and push-pull electrode sections. All push-pull electrode pairs are stimulated by harmonics of the same frequency. For example, a 15 GHz stimulus is used for each pull-pull electrode pair to achieve the 30 GHz spacing. The drive voltage for each push-pull electrode section is different in order to achieve suppression of undesired harmonics.

In summary, the configuration of the multicarrier generator 30' has a plurality of push-pull electrode pair stages, each stage comprising multiple push-pull electrode pairs, a plurality of optical splitters coupled between the respective stages to direct light through multiple stages of pull-pull electrode pairs to further increase induced rotation of an optical field vector associated with the light beam of the laser source. A plurality of optical combiners combine outputs of push-pull electrode pairs in a final stage of the plurality of push-pull electrode stages so as to output a plurality of light beams each at a different frequency offset with respect to a carrier frequency of a light beam that is input to the multicarrier generator 30'. The push-pull electrode pairs in each stage may be driven by a common modulation frequency.

Figure 4:
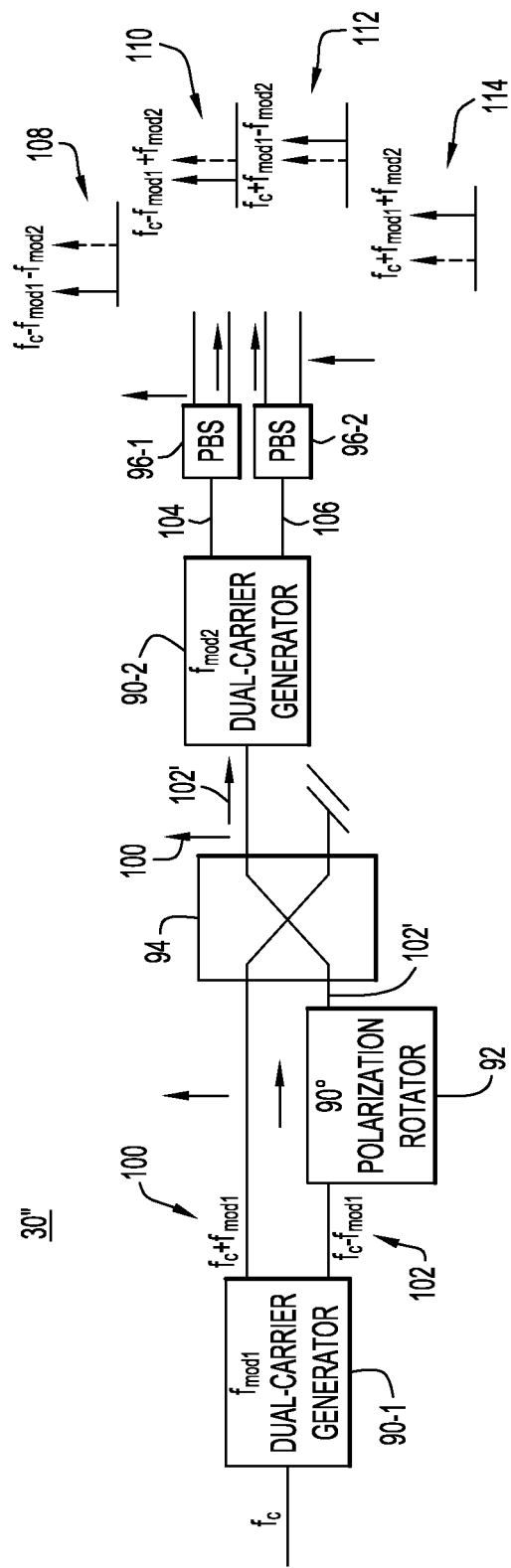
FIG. 4 is a block diagram of a multicarrier generator according to yet another embodiment.

Reference is now made to FIG. 4 for a description for yet another form of the multicarrier generator shown at reference numeral 30". In this form, there are two dual carrier generators 90-1 and 90-2, a 90° polarization rotator 92, a polarizing maintaining coupler 94, and two polarizing beam splitters (PBSs) 96-1 and 96-2. Each dual carrier generator 90-1 and 90-2 is implemented as a dual parallel Mach-Zehnder type IQ modulator similar to that shown in FIG. 2. The dual carrier generators 90-1 and 90-2 are biased at zero transmission for the child modulators, and quadrature for the parent modulators for child and parent modulator sections, respectively.

The dual carrier generator 90-1 receives an input light beam at a carrier frequency $f_c$ and modulates it at a modulation frequency $f_{mod1}$ to produce a first light beam 100 at frequency $f_c-f_{mod1}$ and a second light beam 102 at $f_c+f_{mod1}$. The 90° polarization rotator 92 is coupled to receive the second light beam 102 and rotates its polarization by 90° to produce light beam 102'. The polarizing maintaining coupler 94 receives the light beam 100 and the rotated light beam 102' from the 90° polarizer 92 and supplies both light beams an inputs to the dual carrier generator 90-2.

The dual carrier generator 90-2 is driven by modulation frequency $f_{mod2}$ and outputs two light beams 104 and 106. Light beam 104 is coupled to PBS 96-1 and light beam 106 is coupled to PBS 96-2. PBS 96-1 splits out two beams from light beam 104: light beam 108 at frequency $f_c-f_{mod1}-f_{mod2}$ and light beam 110 at frequency $f_c-f_{mod1}+f_{mod2}$ having a polarization 90° from light beam 108. Similarly, PBS 96-2 splits out two beams from light beam 106: light beam 112 at frequency $f_c+f_{mod1}-f_{mod2}$ and light beam 114 at frequency $f_c+f_{mod1}+f_{mod2}$, where the polarization of light beam 112 is the same as light beam 110, a polarization 90° from light beam 112. In the configuration of the multi-carrier generator 30" the optical fibers used to connect the various components are polarization maintaining, and the M-Z modulators are polarization insensitive. One advantage of the multi-carrier generator 30" is that it requires only two dual carrier generators to generate four subcarriers.

In summary, the multicarrier generator 30" comprises a first dual carrier generator and a second dual carrier generator. The first dual carrier generator is configured to receive a light beam at a carrier frequency and to modulate the light beam at a first modulation frequency to output first and second light beams, the first light beam at a first subcarrier frequency less than the carrier frequency by an amount corresponding to the first modulation frequency (e.g., $f_c-f_{mod1}$) and the second light beam at a second subcarrier frequency corresponding to a sum of the carrier frequency and the first modulation frequency (e.g., $f_c+f_{mod1}$). Moreover, a polarization rotator is provided that rotates the polarization of the second beam by 90 degrees relative to the first beam. The second dual carrier generator is configured to receive as input the first light beam and the second light beam and to modulate each of the first and second light beams with a second modulation frequency ($f_{mod2}$). First and second polarizing beam splitters are provided that are coupled to first and second outputs of the second dual carrier generator. The first polarizing beam splitter is configured to output a third light beam at a third subcarrier frequency ($f_c-f_{mod1}-f_{mod2}$), and a fourth light beam at a fourth subcarrier frequency ($f_c-f_{mod1}+f_{mod2}$) and having a polarization 90 degrees relative to the third light beam. The second polarizing beam splitter is configured to output a fifth light beam at a fifth subcarrier frequency ($f_c+f_{mod1}-f_{mod2}$), and a sixth light beam at a sixth subcarrier frequency ($f_c+f_{mod1}+f_{mod2}$) and having a polarization 90 degrees relative to the fifth light beam. As explained above, the second dual-carrier generator is configured to modulate the first and second light beams at the second modulation frequency ($f_{mod2}$) which is half the first modulation frequency ($f_{mod1}$).

The examples described herein refer to four generated subcarriers. This is only an example. The approaches described herein can be extended to generate a greater number of subcarriers by cascading/nesting more dual carrier generators. In other words, the multicarrier generator described herein comprises a number of cascaded/nested stages of dual carrier generators so as to generate a desired number of light beams at corresponding subcarrier frequencies. In practice, the loss associated with each single side band generator will likely limit the number of generators that can realistically be cascaded.

Figure 5:
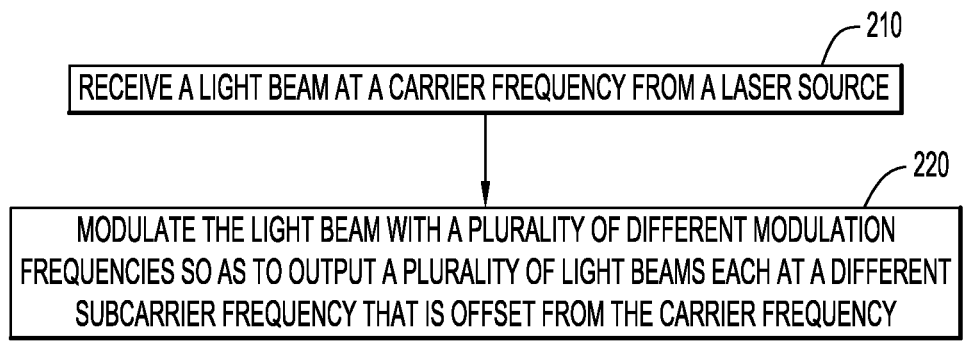
FIG. 5 is a flow chart generally depicting operations associated with generating multiple light beams at multiple subcarrier frequencies using a multicarrier generator.

Turning now to FIG. 5, a flow chart is shown that depicts a method or process for generating multiple optical subcarriers according to the techniques described herein. At 210, a coherent light beam at a carrier frequency is received from a laser source. At 220, the light beam is modulated with one modulation frequency or a plurality of different modulation frequencies so as to output on individual outputs, e.g., fibers, without the use of an optical demultiplexing filter, a plurality of light beams each at a different subcarrier frequency that is offset from the carrier frequency.

The techniques and configurations described herein generate equally spaced optical carriers by electro-optic modulation from a single optical laser source. Each generated subcarrier is phase-locked to the others and available from a separate optical output port. In contrast to other optical carrier generation schemes, these techniques do not require additional optical filters to separate the generated carriers.

The above description is intended by way of example only.
What is claimed is:
1. An apparatus comprising:
  a laser source configured to generate as output a light beam at a carrier frequency; and
  a multicarrier generator coupled to the laser source and comprising one or more dual carrier generators each configured to modulate the light beam at the same modulation frequency or at different modulation frequencies so as to output on individual outputs, without an optical demultiplexing filter, a plurality of light beams each at a different subcarrier frequency that is offset from the carrier frequency.

2. The apparatus of claim 1, wherein the multicarrier generator comprises a plurality of dual carrier generators connected in a cascaded manner.

3. The apparatus of claim 2, wherein the multicarrier generator comprises a first dual carrier generator coupled to receive as input the light beam at the carrier frequency output by the laser source and to modulate the light beam at a first modulation frequency so as to output a first light beam at a first subcarrier frequency that is less than the carrier frequency by an amount corresponding to the first modulation frequency and a second light beam at a second subcarrier frequency that is greater than the carrier frequency by an amount corresponding to the first modulation frequency, and second and third dual carrier generators coupled to the first dual carrier generator, wherein the second dual carrier generator is configured to receive as input the first light beam at the first subcarrier frequency and the third dual carrier generator is configured to receive as input the second light beam at the second subcarrier frequency.

4. The apparatus of claim 3, wherein the second dual carrier generator is configured to modulate the first light beam at a second modulation frequency to output a third light beam at a third subcarrier frequency that is less than the carrier frequency by an amount equal to a sum of the first modulation frequency and the second modulation frequency and to output a fourth light beam at a fourth subcarrier frequency that is less than the carrier frequency by an amount corresponding to the difference of the first modulation frequency and the second modulation frequency.

5. The apparatus of claim 4, wherein the third dual carrier generator is configured to modulate the second light beam at the second modulation frequency to output a fifth light beam at a fifth subcarrier frequency that is greater than the carrier frequency by an amount corresponding to the first modulation frequency minus the second modulation frequency, and to output a sixth light beam at a sixth subcarrier frequency that is greater than the carrier frequency by an amount corresponding to a sum of the first modulation frequency and the second modulation frequency.

6. The apparatus of claim 4, wherein the first modulation frequency is twice the second modulation frequency.

7. The apparatus of claim 1, wherein the multicarrier generator comprises a plurality of push-pull electrode pair stages, each stage comprising multiple push-pull electrode pairs, a plurality of optical splitters coupled between the respective stages to direct light through multiple stages of pull-pull electrode pairs to further increase induced rotation of an optical field vector associated with the light beam of the laser source, and a plurality of optical combiners to combine outputs of push-pull electrode pairs in a final stage of the plurality of push-pull electrode stages so as to output the plurality of light beams.

8. The apparatus of claim 7, wherein the push-pull electrode pairs in each stage are driven by a common modulation frequency.

9. The apparatus of claim 1, wherein the multicarrier generator comprises a first dual carrier generator and a second dual carrier generator, the first dual carrier generator configured to receive the light beam at the carrier frequency and to modulate the light beam at a first modulation frequency to output first and second light beams, the first light beam at a first subcarrier frequency less than the carrier frequency by an amount corresponding to the first modulation frequency and the second light beam at a second subcarrier frequency corresponding to a sum of the carrier frequency and the first modulation frequency, further including a polarization rotator configured to rotate the polarization of the second beam 90 degrees relative to the first beam, and the second dual carrier generator configured to receive as input the first light beam and the second light beam and to modulate each of the first and second light beams with a second modulation frequency.

10. The apparatus of claim 9, wherein the second dual carrier generator is configured to modulate the first and second light beams at the second modulation frequency which is half the first modulation frequency.

11. The apparatus of claim 10, and further comprising first and second polarizing beam splitters coupled to first and second outputs of the second dual carrier generator, the first polarizing beam splitter configured to output a third light beam at a third subcarrier frequency, a fourth light beam at a fourth subcarrier frequency and having a polarization 90 degrees relative to the third light beam, and the second polarizing beam splitter configured to output a fifth light beam at a fifth subcarrier frequency and a sixth light beam at a sixth subcarrier frequency and having a polarization 90 degrees relative to the fifth light beam.

12. The apparatus of claim 1, wherein the multicarrier generator comprises a number of cascaded stages of dual carrier generators so as to generate a desired number of light beams at corresponding subcarrier frequencies.

13. A method comprising:
receiving a coherent light beam at a carrier frequency from a laser source; and
modulating the light beam with one modulation frequency or a plurality of different modulation frequencies so as to output on individual outputs, without the use of an optical demultiplexing filter, a plurality of light beams each at a different subcarrier frequency that is offset from the carrier frequency.

14. The method of claim 13, wherein modulating comprises modulating the light beam at the carrier frequency at a first modulation frequency and modulating light beams resulting therefrom at a second modulation frequency that is half the first modulation frequency.

15. The method of claim 13, wherein modulating comprises modulating with a plurality of dual carrier generators connected in a cascaded manner such that a first stage dual carrier generator modulates the light beam at the carrier frequency at the first modulation frequency and second and third dual carrier generators modulate light beams output by the first dual carrier generator at the second modulation frequency.

16. The method of claim 13, wherein modulating comprises modulating with a plurality of push-pull electrode pair stages to generate the plurality of light beams at the different subcarriers by letting light travel through multiple push-pull electrode pair stages such that each stage further increases an induced rotation of an optical field vector of the light beam at the carrier frequency.

17. An apparatus comprising:
means for generating a coherent light beam at a carrier frequency; and
means for modulating the light beam at the same modulation frequency or a different modulation frequency so as to output on individual outputs, without an optical demultiplexing filter, a plurality of light beams each at a different subcarrier frequency that is offset from the carrier frequency.

18. The apparatus of claim 17, wherein the means for modulating comprises a plurality of dual carrier generators connected in a cascaded manner.

19. The apparatus of claim 17, wherein the means for modulating comprises a plurality of push-pull electrode pair stages, each stage comprising multiple push-pull electrode pairs, a plurality of optical splitters coupled between the respective stages to direct light through multiple stages of pull-pull electrode pairs to further increase induced rotation of an optical field vector associated with the light beam of the laser source, and a plurality of optical combiners to combine outputs of push-pull electrode pairs in a final stage of the plurality of push-pull electrode stages so as to output the plurality of light beams.

20. The apparatus of claim 17, wherein the means for modulating comprises a number of cascaded stages of dual carrier generators so as to generate a desired number of light beams at corresponding subcarrier frequencies.

* * * * *